(12) United States Patent
Knight

(10) Patent No.: US 9,200,809 B2
(45) Date of Patent: Dec. 1, 2015

(54) BARBEQUE OVEN

(75) Inventor: David B. Knight, Cape Girardeau, MO (US)

(73) Assignee: David B. Knight & Associates, Inc., Cape Girardeau, MO (US)

( * ) Notice: Subject to any disclaimer, the term of this patent is extended or adjusted under 35 U.S.C. 154(b) by 398 days.

(21) Appl. No.: 12/889,237

(22) Filed: Sep. 23, 2010

(65) Prior Publication Data

US 2012/0073557 A1    Mar. 29, 2012

(51) Int. Cl.
| F24C 15/00 | (2006.01) |
| F24B 1/22 | (2006.01) |
| F24C 15/08 | (2006.01) |
| F24C 15/16 | (2006.01) |

(52) U.S. Cl.
CPC . *F24B 1/22* (2013.01); *F24C 15/08* (2013.01); *F24C 15/16* (2013.01)

(58) Field of Classification Search
CPC ......... F24C 15/08; F24C 15/16; F24C 15/005
USPC ..................................... 126/36, 19 R; 99/337
See application file for complete search history.

(56) References Cited

U.S. PATENT DOCUMENTS

| 1,274,276 | A | * | 7/1918 | Kaslaitis ........................ 126/36 |
| 1,570,489 | A | * | 1/1926 | Hill .............................. 126/99 R |
| 2,147,801 | A | * | 2/1939 | Scanlan ........................ 137/113 |
| 2,339,365 | A | * | 1/1944 | Van Guilder ................... 432/76 |
| 2,510,856 | A | | 6/1950 | Bettencourt |
| 2,558,569 | A | | 6/1951 | Koch |
| 2,833,201 | A | | 5/1958 | Simank |
| 2,950,669 | A | * | 8/1960 | Terry ........................... 99/421 H |
| 2,956,497 | A | | 10/1960 | Bernstein |
| 3,086,698 | A | | 4/1963 | Goldstein |
| 3,326,201 | A | | 6/1967 | Murray |
| 3,364,912 | A | | 1/1968 | Dills et al. |
| 3,397,632 | A | * | 8/1968 | Moler .......................... 99/329 R |
| 3,474,225 | A | | 10/1969 | Leedy |
| 3,477,360 | A | * | 11/1969 | Raney ............................. 99/339 |
| 3,658,047 | A | * | 4/1972 | Happel ....................... 126/21 A |
| 3,665,840 | A | * | 5/1972 | Horany .......................... 99/479 |
| 3,669,041 | A | * | 6/1972 | Schworer ...................... 110/193 |
| 3,861,290 | A | * | 1/1975 | Ringo ............................ 99/427 |
| 3,882,767 | A | * | 5/1975 | Oyler et al. ..................... 99/339 |
| 4,010,729 | A | | 3/1977 | Egli |
| 4,263,887 | A | * | 4/1981 | Dowdall ................... 126/116 A |
| 4,287,870 | A | | 9/1981 | Johnson |
| 4,300,523 | A | * | 11/1981 | Robertson et al. .......... 126/21 A |
| 4,307,703 | A | * | 12/1981 | Russo ........................... 126/200 |
| 4,344,358 | A | | 8/1982 | Maurer |
| 4,510,854 | A | * | 4/1985 | Robertson ...................... 99/337 |
| 4,574,689 | A | * | 3/1986 | Robertson ...................... 99/337 |
| 4,791,909 | A | * | 12/1988 | Kalthoff ..................... 126/21 A |

(Continued)

*Primary Examiner* — Avinash Savani
*Assistant Examiner* — George R Blum
(74) *Attorney, Agent, or Firm* — Senniger Powers LLP

(57) ABSTRACT

An oven for cooking foods includes a housing having a front, a back, a top, a bottom and opposing first and second sides. The oven further includes a vessel for holding solid fuel for cooking. A fire chamber in the housing is adapted for holding the solid fuel vessel. The housing includes a first movable closure at a location on the front of the housing mounted for opening and closing at a location to permit selective access to the solid fuel vessel in the fire chamber. A cooking chamber in the housing is adapted for holding food to be cooked by the oven. The housing further includes a second movable closure on the front of the housing mounted for opening and closing at a location to permit access to the cooking chamber.

20 Claims, 8 Drawing Sheets

(56) References Cited

U.S. PATENT DOCUMENTS

| | | | |
|---|---|---|---|
| 4,802,459 A | 2/1989 | McFadden et al. | |
| 4,819,614 A * | 4/1989 | Hitch | 126/36 |
| 4,823,684 A | 4/1989 | Traeger et al. | |
| 5,154,159 A | 10/1992 | Knafelc et al. | |
| 5,158,066 A * | 10/1992 | Dodgen | 126/25 R |
| 5,176,124 A | 1/1993 | Wrasse | |
| 5,478,985 A * | 12/1995 | Hoetzl et al. | 219/400 |
| 5,570,627 A * | 11/1996 | Dahlstrom et al. | 99/427 |
| 5,704,278 A * | 1/1998 | Cross | 99/427 |
| 5,711,209 A * | 1/1998 | Guines | 99/339 |
| 6,113,386 A * | 9/2000 | Shannon et al. | 432/59 |
| 6,810,792 B1 * | 11/2004 | Knight | 99/340 |
| 7,060,942 B2 * | 6/2006 | Friedl et al. | 219/411 |
| D534,755 S * | 1/2007 | Knight | D7/332 |
| 7,241,977 B2 * | 7/2007 | Friedl et al. | 219/411 |
| 7,409,904 B2 * | 8/2008 | Blumel et al. | 99/427 |
| 7,431,029 B2 * | 10/2008 | Kim et al. | 126/198 |
| 7,451,691 B2 * | 11/2008 | Robertson | 99/330 |
| 7,766,003 B2 | 8/2010 | Kim et al. | |
| 2003/0172919 A1 * | 9/2003 | Rabas et al. | 126/21 A |
| 2009/0056695 A1 | 3/2009 | Cosgrove | |
| 2010/0003387 A1 * | 1/2010 | Knight | 426/523 |
| 2011/0275023 A1 * | 11/2011 | Knight | 432/1 |
| 2012/0073557 A1 * | 3/2012 | Knight | 126/19 R |

* cited by examiner

BARBEQUE OVEN

FIELD OF THE INVENTION

The present invention generally relates to a barbeque oven having a space conscious design and a burner mounted for increasing efficiency of the oven.

BACKGROUND OF THE INVENTION

Space in a commercial kitchen is at a premium. Thus, it is desirable to use the vertical space by making ovens tall in relation to their width and/or depth. A tall oven, however, restricts the location and arrangement of its components.

One type of oven that may be vertically oriented is a barbecue oven. However, there are other ovens which are not used for barbeque cooking that can be vertically oriented. Barbecuing is a cooking process that typically involves the cooking of foods by exposing them to relatively low temperature smoke for a number of hours. The structure used for barbecuing typically includes a heating or fire chamber, a cooking chamber and a conduit or flue through which smoke and heated combustion gases are transported from the fire chamber to the cooking chamber. Smoke and heat is produced by burning a smoke producing substance in the fire chamber such as wood, which is periodically replenished, until cooking is completed. The fire chamber is traditionally located to the side of the cooking chamber because grease often drips from the food being cooked. If the grease contacts the burning fuel, it could ignite. Accessing the fire chamber from the side requires additional space on the side of the oven to allow a person access to the fire chamber and to permit room for the first chamber to open out to the side of the oven. Because space in a commercial kitchen is limited, this required additional space is a huge inconvenience.

The vertical orientation of the oven also causes inefficiency in heat transfer between the fire chamber and cooking chamber as the distance between the food in the cooking chamber and the source of fuel in the fire chamber is greater than in traditional, shorter ovens. Therefore, there exist a need for an oven that has an improved heat transfer capability between the fire chamber and the cooking chamber.

SUMMARY OF THE INVENTION

In one aspect of the present invention, an oven for cooking foods generally comprises a housing including a front, a back, a top, a bottom and opposing first and second sides. The oven further comprises a vessel for holding solid fuel for cooking. A fire chamber in the housing is adapted for holding the solid fuel vessel. The housing comprises a first movable closure at a location on the front of the housing mounted for opening and closing at a location to permit selective access to the solid fuel vessel in the fire chamber. A cooking chamber in the housing is adapted for holding food to be cooked by the oven. The housing comprises a second movable closure on the front of the housing mounted for opening and closing at a location to permit access to the cooking chamber.

In another aspect of the present invention, an oven for cooking foods generally comprises a housing including a front, a back, a top, a bottom and opposing first and second sides. A cooking chamber in the housing is adapted to hold food to be cooked. The oven further comprises a vessel for holding solid fuel for cooking. The vessel has a burner side. A fire chamber in the housing is adapted for holding the solid fuel vessel. A burner chamber in the housing holds a burner for producing a flame to ignite the solid fuel in the solid fuel vessel in the fire chamber. A tube has a longitudinal axis and is attached to an outlet of the burner and opens into the fire chamber and toward the burner side of the solid fuel vessel when disposed in the fire chamber. The tube is oriented so that the longitudinal axis of the tube is oblique to the burner side of the solid fuel vessel as received in the fire chamber.

In yet another aspect of the present invention, an oven for cooking foods generally comprises a housing including a front, a back, a top, a bottom and opposing first and second sides. A cooking chamber in the housing for holding food to be cooked has a bottom wall. The oven further comprises a vessel for holding solid fuel for cooking. A fire chamber in the housing includes a floor adapted for holding the solid fuel vessel at a location within the fire chamber. The fire chamber is in fluid communication with the cooking chamber for passing heated air and smoke into the cooking chamber. At least a portion of the cooking chamber being located directly above the solid fuel vessel location in the housing. A heat shield in the housing is disposed above the solid fuel vessel location in the fire chamber and below the cooking chamber bottom wall. The heat shield separates the fire chamber from the cooking chamber for impairing radiative heat transfer from the fire chamber to the cooking chamber.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
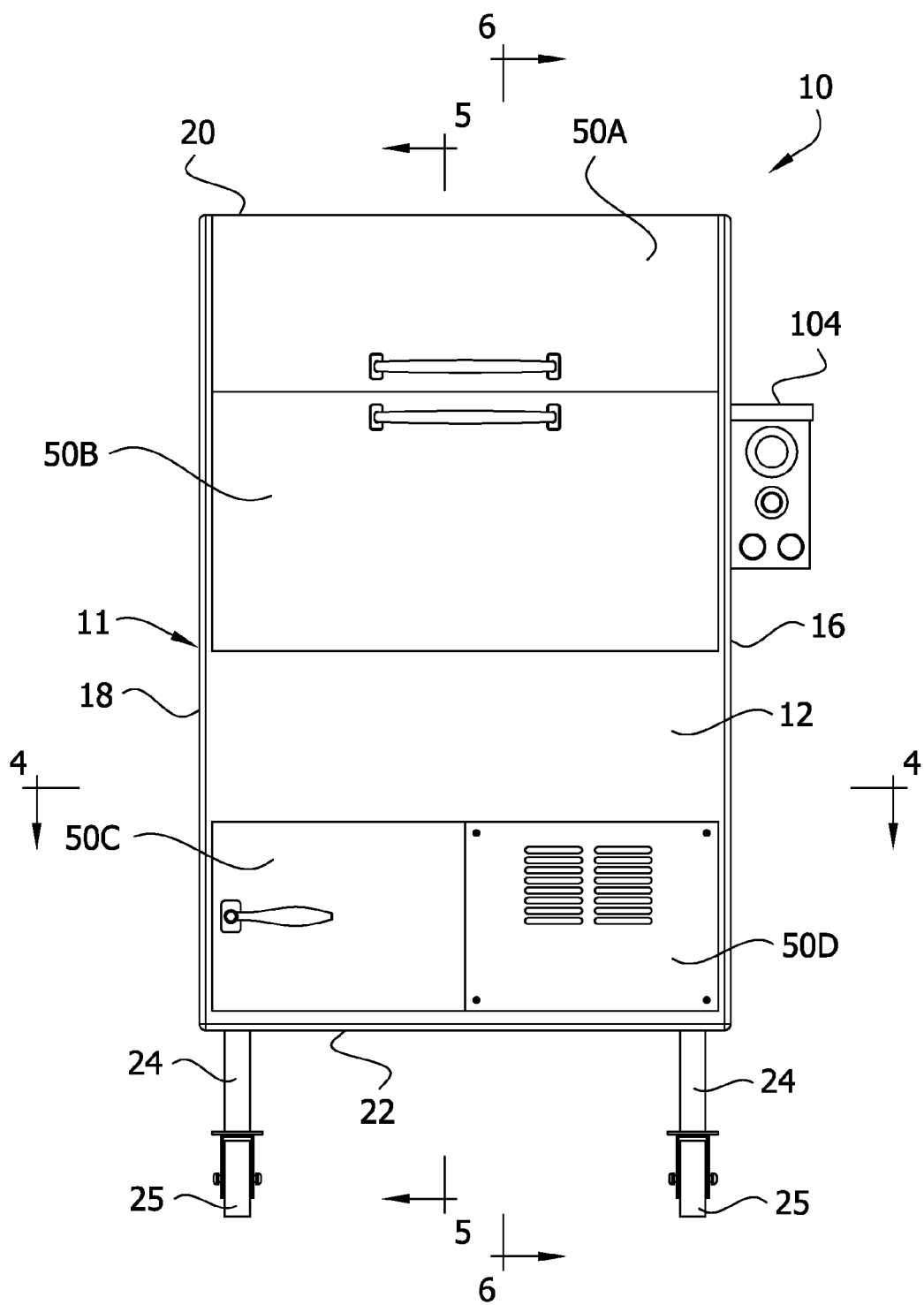
FIG. 1 is a front elevation of a barbeque oven of the present invention.
Figure 2:
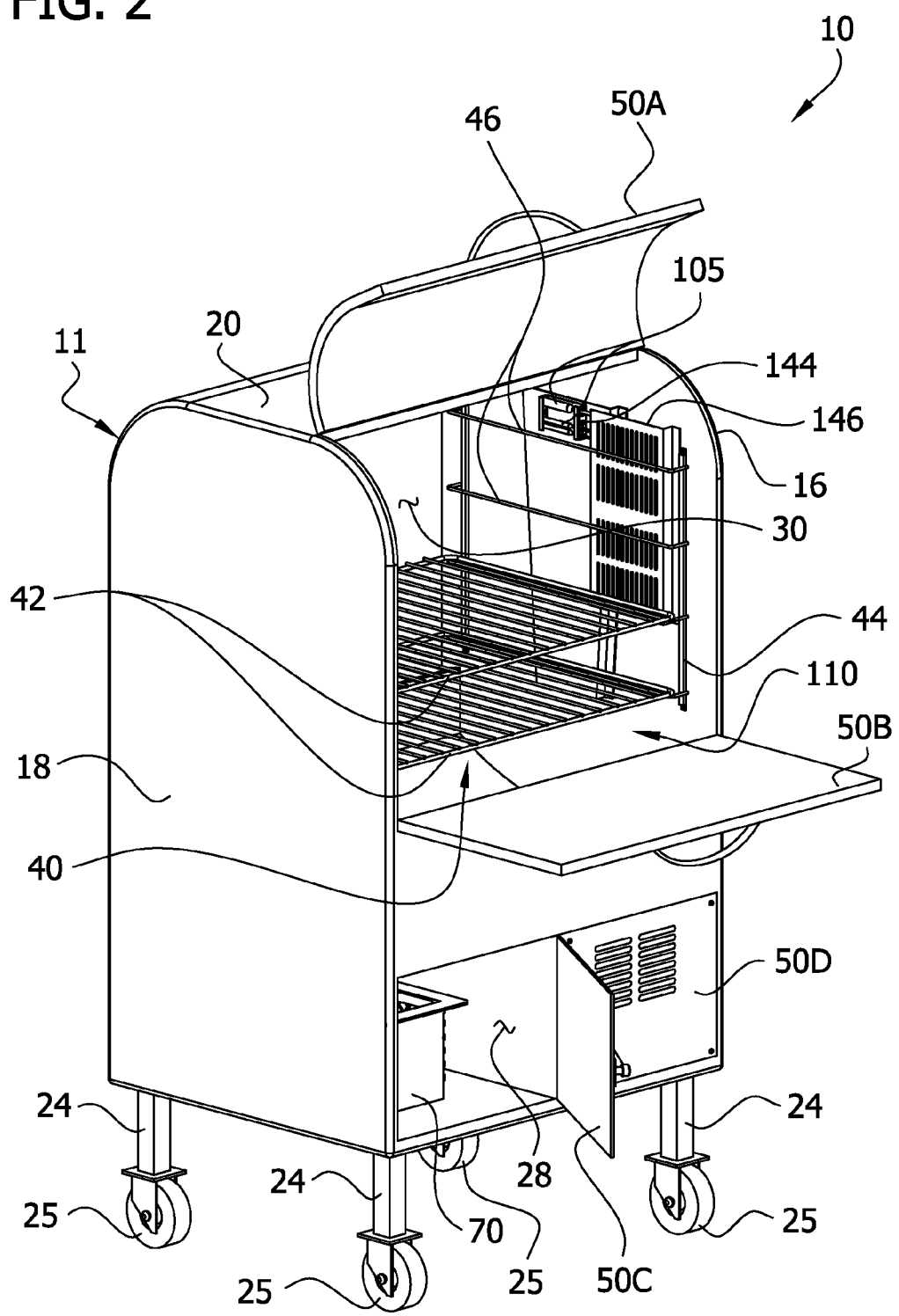
FIG. 2 is a perspective of the oven with doors of the oven open to show internal construction.
Figure 3:
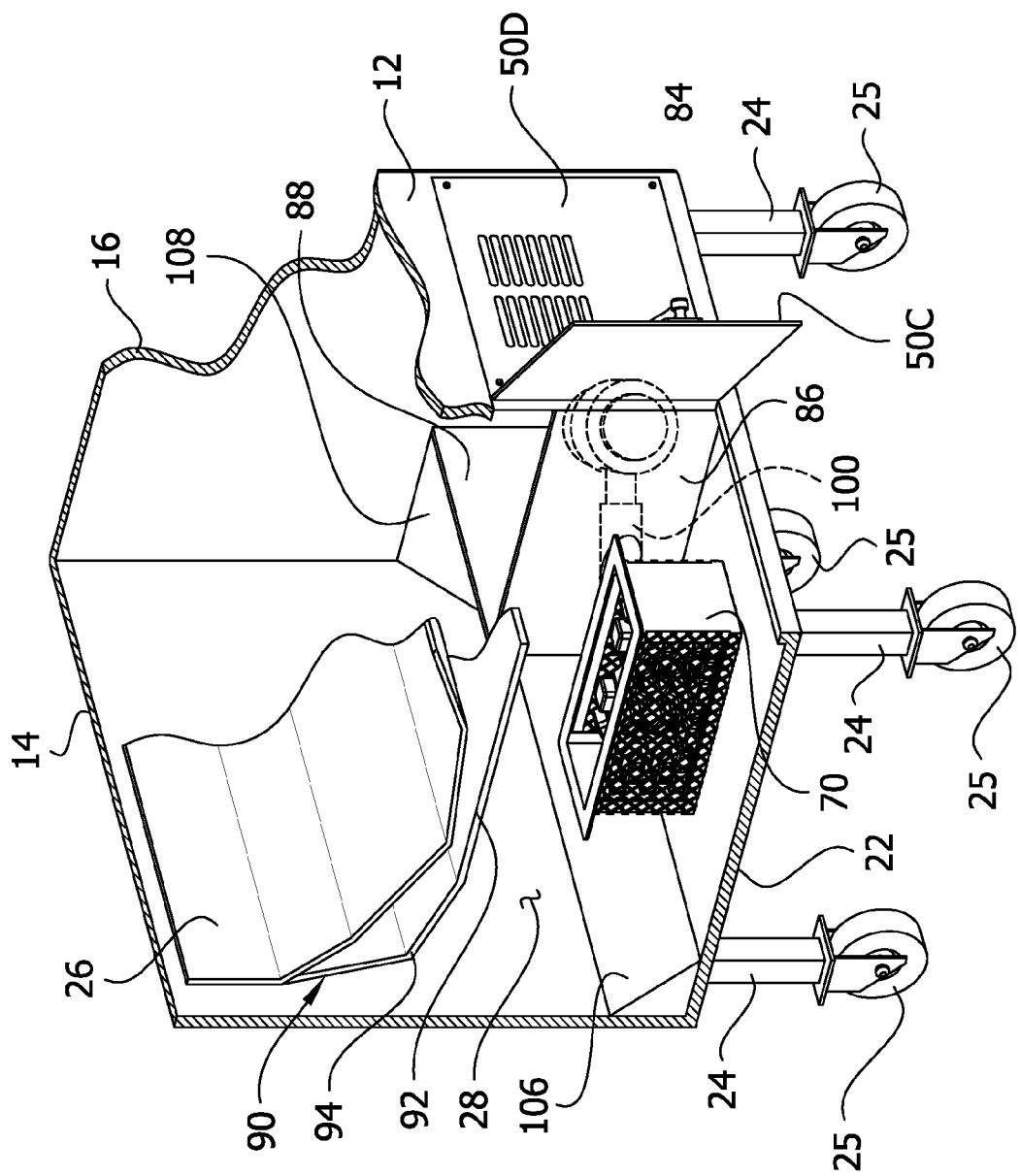
FIG. 3 is a perspective of the oven with portions broken away to show internal construction.

Referring now to the drawings and in particular to FIGS. 1-3, a barbecue oven that circulates heat and smoke around the food to be cooked is designated generally by reference numeral 10. For purposes of illustration, the invention will be described in conjunction with a barbecue oven, and in particular a barbecue oven of the type disclosed in co-assigned U.S. Pat. No. 6,810,792, the entire disclosure of which is incorporated herein by reference. However, the invention is not to be limited to this specific use, as it is instead intended that the invention be used in any application in which circulation of heated air in an oven is required. The oven 10 includes a housing, indicated generally at 11, which comprises a front wall 12, a back wall 14, side walls 16 and 18, a top 20 and a bottom 22. The front, back and side walls 12, 14, 16, 18, constitute wall members which together form vertical walls of the housing 11. The number of wall members forming the vertical wall may be other than described without departing from the scope of the present invention.

The housing 11 is supported by legs 24 that include wheels 25 to facilitate transport of the oven 10. The housing 11 is suitably constructed of heat resistant materials such as stainless steel. However, other metals or porcelain coated materials suitable for use in cooking ovens can also be utilized. The housing 11 may have draft portals (not shown), such as in one or both of the sidewall 16, 18. The oven 10 may also include insulation material in various parts thereof to maintain temperatures in the oven and to protect users from heat generated by burning fuel in the oven. Insulation may comprise a double-wall construction of the walls 12, 14, 16, 18, 20 and 22 thereof. The double-wall structure may include insulating material between the walls, such as high-temperature mineral wool or other non-combustible material.

Figure 4:
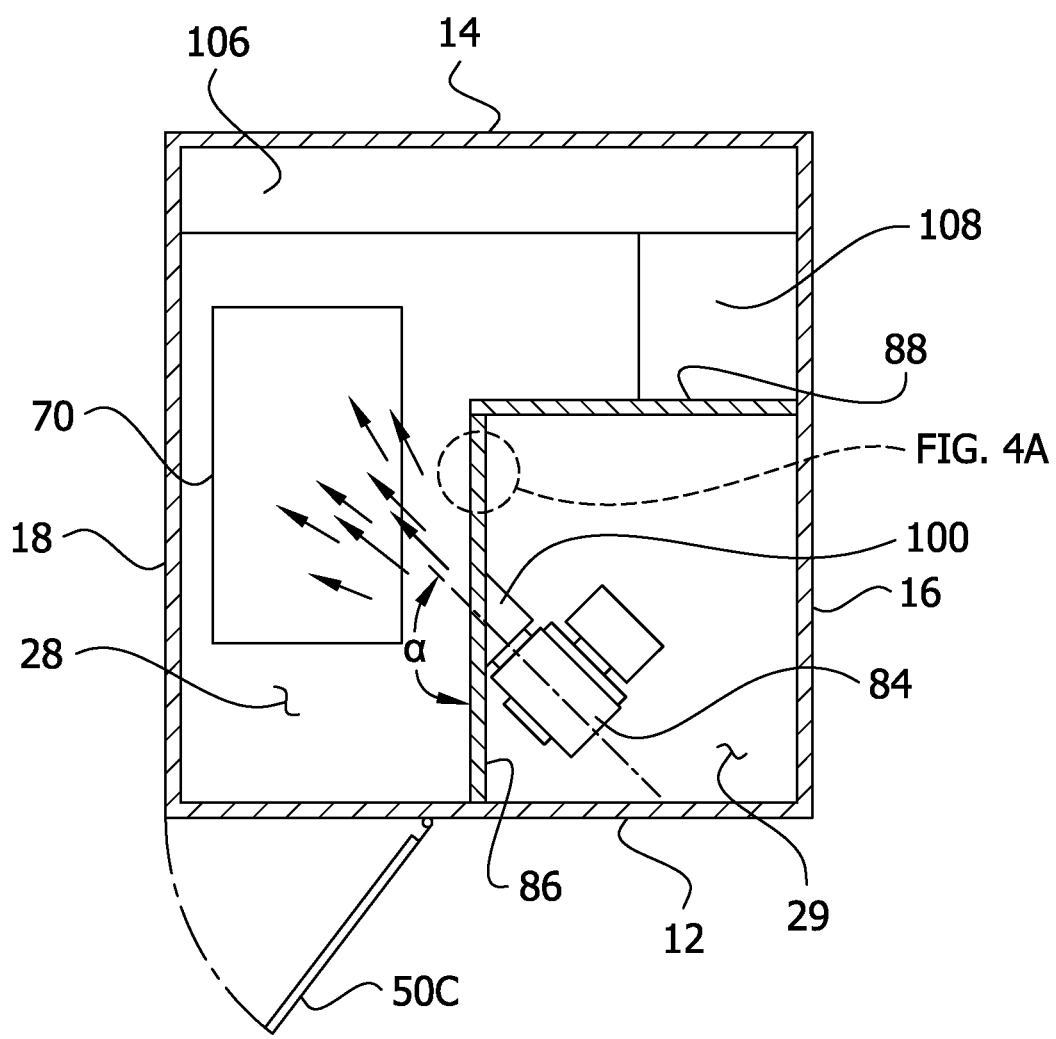
FIG. 4 is a cross-section of the oven taken through line 4-4 in FIG. 1 illustrating heat flow from a burner of the oven.
Figure 4A:
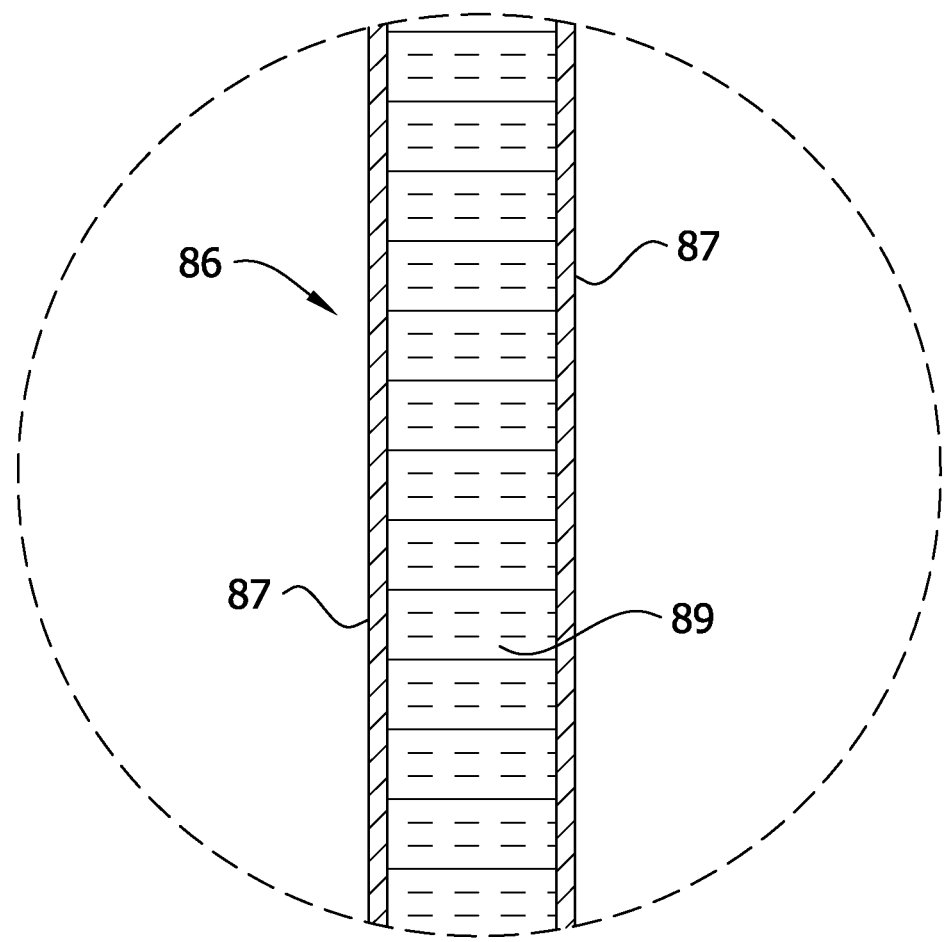
FIG. 4A is an enlarged fragmentary cross section of a side firebox wall of the oven taken as indicated in FIG. 4.

Referring to FIG. 4, a side firebox wall 86 extends rearwardly from the front wall 12 generally parallel to the side walls 16, 18. A rear firebox wall 88 extends from a back end of the side firebox wall 86 to the side wall 16, generally parallel to the front and back walls 12, 14. The side and rear firebox walls 86, 88 have a double-wall construction including wall members 87 and insulation material 89 between the wall members to maintain temperatures in the fire chamber 28 and to protect users and other components and compartments of the oven 10 from heat generated by burning fuel in the fire chamber (FIG. 4A). The insulation material 89 may be formed from high-temperature mineral wool or other non-combustible material.

Figure 5:
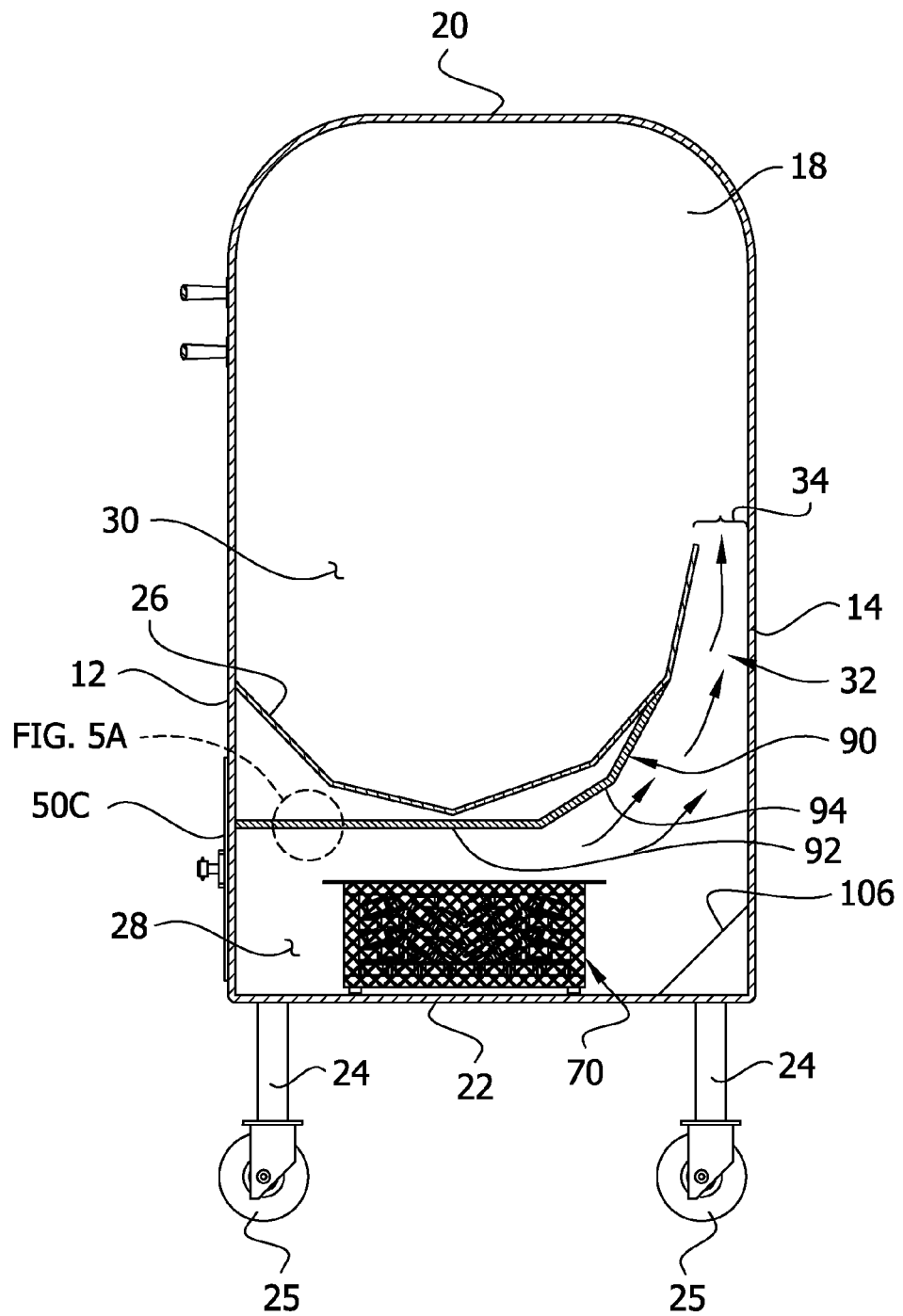
FIG. 5 is a cross-section of the oven taken through line 5-5 in FIG. 1 with internal components in the upper portion of the oven removed illustrating a flow path of heated air and smoke in the oven.
Figure 5A:
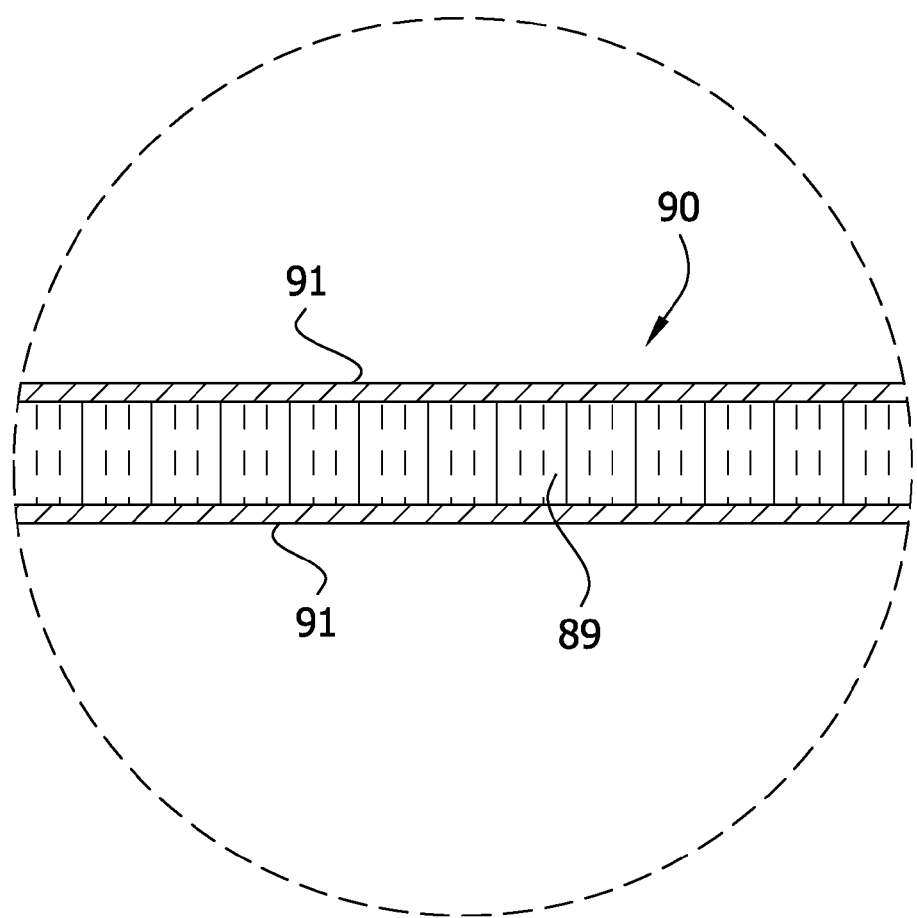
FIG. 5A is an enlarged fragmentary cross section of a top firebox wall of the oven taken as indicated in FIG. 5.
Figure 6:
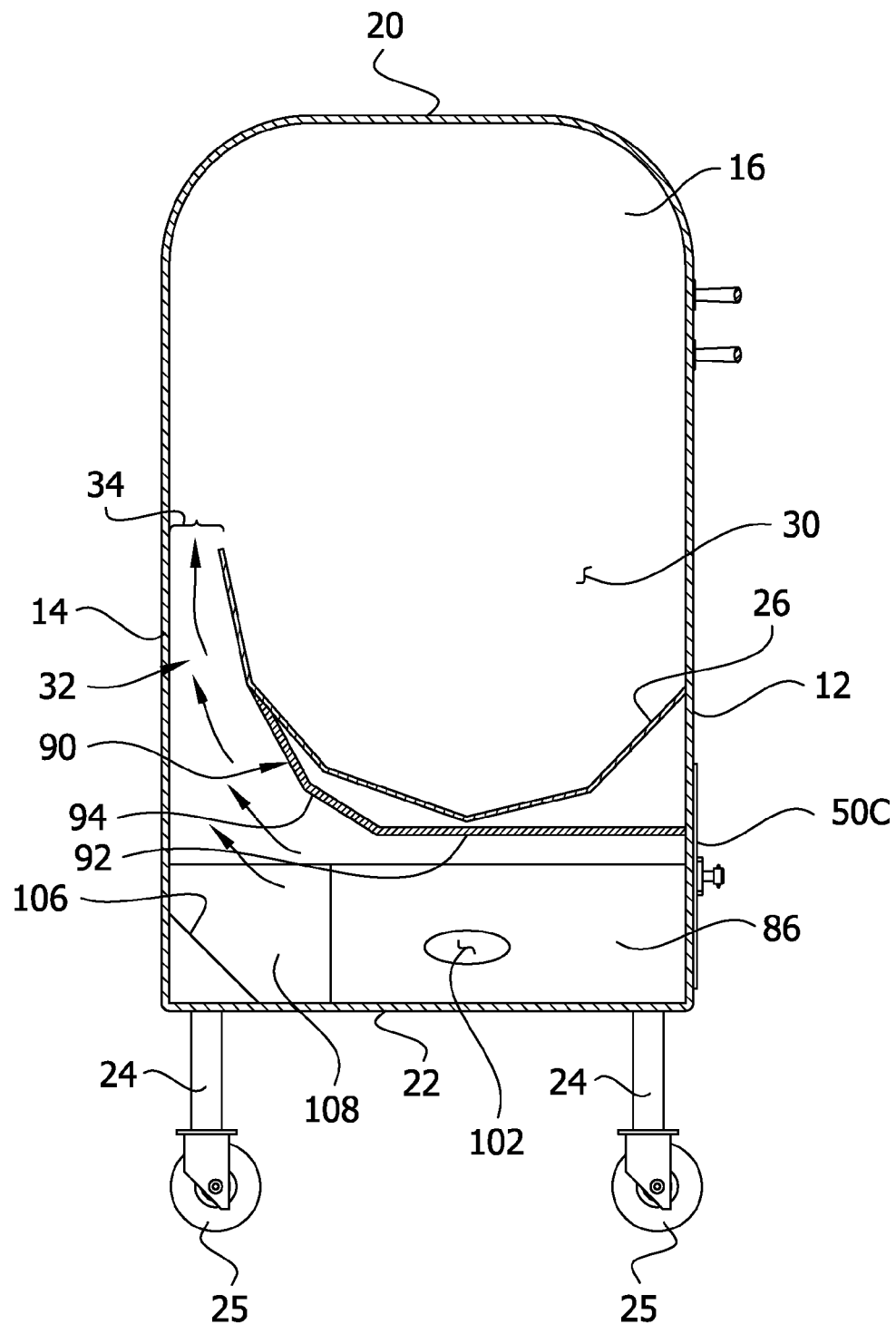
FIG. 6 is a cross-section of the oven taken through line 6-6 in FIG. 1 with internal components in the upper portion of the oven removed.

Referring to FIGS. 3, 5 and 6, a top firebox wall 90 (broadly, "a heat shield") is disposed above the side and rear firebox walls 86, 88. In the illustrated embodiment, the top firebox wall 90 extends between the opposite side walls 16, 18 along an interior width of the oven 10 forming a burner chamber 29 and a fire chamber 28. The side firebox wall 86 separates the fire chamber 28 from the burner chamber 29. The top firebox wall 90 also extends from the front wall 12 to near the back wall 14 along an interior depth of the oven. The top firebox wall 90 has a horizontal portion 92 extending from the front wall 12 that covers the burner chamber 29 and a substantial portion of the fire chamber 28, and a generally angled portion 94 extending rearward and upward from the horizontal portion near the back wall 14. The horizontal portion 92 is generally parallel to the floor of the fire chamber 28. The angled portion 94 is formed with two upward bends giving it a generally arcuate configuration. The angled portion 94 terminates at a cook chamber bottom wall 26 disposed above the top firebox wall 90. The top firebox wall and side and rear firebox walls 86, 88 are secured to each other and to the front wall 12 and side walls 16, 18 of the housing 11 such as by welding. However, the firebox walls 86, 88, 90 can be secured to the housing 11 and each other using suitable brackets and fasteners (not shown) without departing from the scope of the invention. In particular, because the fire chamber 28 is located below the cooking chamber 30, insulation from radiative heat from the bottom of the cooking chamber to the food in the cooking chamber is needed. This is provided by the top firebox wall 90. The top firebox wall like the side and rear firebox walls 86, 88 has a double-wall construction including wall members 91 and insulation material 89 between the wall members. The firebox walls 86, 88, 90 are spaced from other walls of the oven to permit expansion and contraction and to insulate the fire chamber 28. It will be appreciated that the firebox walls 86, 88, 90, fire chamber 28 and burner chamber 29 may have other configurations within the scope of the present invention.

Referring to FIGS. 5 and 6, the cook chamber bottom wall 26 is disposed above the top firebox wall 90 and defines a floor of a cooking chamber 30 of the oven 10. In one embodiment, the cook chamber bottom wall 26 extends between the opposite side walls 16, 18 along the interior width of the oven 10 and extends from the front wall 12 to near the back wall 14 along the interior depth of the oven. The oven 10 has a generally vertical orientation, meaning that the vertical dimension of the cooking chamber 30 is greater than at least one of its horizontal dimensions. Moreover, the cooking chamber 30 is located above the fire chamber 28. The cook chamber bottom wall 26 has multiple bends giving it a generally arcuate shape with a rear portion that extends upward to form a tapered delivery duct 32 having a throat 34 between the cook chamber bottom wall and the back wall 14. The delivery duct 32 is defined by the rear portion of the cook chamber bottom wall 26, angled portion 94 of top firebox wall 90, a portion of the back wall 14 generally opposing the rear portion of the cook chamber bottom wall and angled portion of the top firebox wall, and sections of the side walls 16, 18 extending between the rear portions of the firebox wall and top firebox wall and opposing portions of the back wall. A first end or inlet of the delivery duct 32 is located in a horizontal plane between the lowest point of the top firebox wall 90 and the back wall 14. Heated air and smoke from the fire chamber 28 pass through the throat 34 to the cooking chamber 30. One or more flanges (not shown) extending from the cook chamber bottom wall 26 to the back wall 14 may secure the cook chamber bottom wall to the back wall without substantially blocking the throat 34. The cook chamber bottom wall 26 is fixed to the front wall 12 and the side walls 16, 18 of the housing 11 such as by welding. However, the cook chamber bottom wall 26 can be fixed to the housing 11 using suitable brackets and fasteners (not shown) without departing from the scope of the invention. It will be appreciated that the cook chamber bottom wall 26 may have other configurations within the scope of the present invention.

Referring to FIG. 2, a food support, indicated generally at 40, is located within the cooking chamber 30. In the illustrated embodiment, the food support 40 includes a plurality of racks 42 (two upper racks being removed in FIG. 2 for clarity) supported on brackets 44 that are secured to the sidewalls 16, 18 of the housing 11. Each bracket 44 includes vertically spaced rails 46, each aligned with a corresponding one of the rails on the bracket 44 on the opposite side wall (16 or 18). The rails of each pair of aligned rails receive opposite edge margins of one of the racks 42 to support the rack in the cooking chamber 30. In the illustrated embodiment, the rails 46 are collectively considered to be a "food support mount". Generally speaking, the food support 40 may have various configurations (not shown), including rotisserie-style racks, rotating spits, shelves, or baskets without departing from the scope of the invention. The food support mount would be appropriate for the particular food support being used.

A pair of upper lids or doors 50A, 50B (shown in the open position in FIG. 2) makes up a portion of the front wall 12 and the top 20 of the housing 11 and provides access to the cooking chamber 30. The doors 50A, 50B may have a heat resistant glass window (not shown) located therein to allow the user to monitor the food product being cooked without having to open the door. Also located on the doors 50A, 50B may be a thermometer (not shown) that indicates the temperature inside the oven 10 to aid in regulating the fire in the fire chamber 28. During operation of the oven 10, the doors 50A, 50B are typically in a closed position except when inserting food or retrieving food from the oven 10. A lower door 50C is located at a lower portion of the front wall 12. The lower door 50C provides access to the fire chamber 28. This is a change from the conventional ovens which place the fire chamber door on the side of the oven. The fire chamber door 50C opens in a direction forward of the front wall 12, as do cooking chamber doors 50A, 50B. By having the fire chamber door 50C on the front of the oven 10, it permits the oven to be placed closer to other equipment or walls on either side of the oven. Thus, when an operator needs to add more fuel to oven 10, the operator need only gain access to the front of the oven. A panel 50D is mounted to the front 12 of the oven by suitable fasteners such as screws (FIG. 1). The panel 50D provides front access to the burner chamber 29. Access to all interior compartments of the oven 10 can be acquired from the front of the oven.

In one embodiment, smoke exits the cooking chamber 30 into an exhaust stack (not shown) through a portal (not shown) located in the sidewall 16 so that the portal is below the lowermost rack 42. This location of the portal facilitates removal of smoke in an amount and rate which promotes circulation of smoke and maintenance of smoldering solid fuel in the fire chamber 28. Thus, food in the oven 10 is properly cooked and flavored by the smoke without being over-exposed to the heat and smoke. There may be more than one portal and exhaust stack within the scope of the invention. Other ways for venting smoke from the cooking chamber 30, including specifically different portal locations, are contemplated without departing from the scope of the invention.

The fire chamber 28 contains a fuel vessel, broadly a heat source, generally indicated at 70. In the illustrated embodiment, the fuel vessel 70 is a solid fuel vessel that holds combustible material such as wood logs, wood chips, lump charcoal, compressed charcoal, wood pellets, and the like. The fuel vessel 70 may also contain a relatively small quantity of a smoke producing material such as hickory wood. It is also to be understood that no smoke producing material or vessel containing such material need be present within the scope of the present invention. The vessel 70 sits on the bottom 22 of the housing 11 to maintain the vessel in its proper position in the fire chamber 28. As best seen in FIG. 4, the vessel 70 is suitably elongated in shape and during use in the oven 10 extends longitudinally in the depthwise direction of the oven.

A burner 84 is located in the burner chamber 29. In the illustrated embodiment, the burner 84 is a gas-fired power burner configured to burn natural gas, LP gas, or other fuel to provide a heat source. A burner tube 100 is attached to an outlet of he burner 84 and extends to a hole 102 in the side firebox wall 86. Because the burner tube 100 intersects the wall 86 at an angle, the hole 102 is an ellipse rather than a circle. The elliptical hole 102 is elongated in the lengthwise direction of the vessel (i.e., in the front-to-back direction of the oven 10). The tube 100 is mounted in a suitable manner on the side firebox wall 86, such as by a bracket (not shown). The tube 100 opens through the side firebox wall 86 at an oblique angle so that the tube is oriented relative to the fire chamber 28 at an oblique angle. In the illustrated embodiment, the tube 100 is oriented relative to the side firebox wall 86 at an angle a of about 135 degrees measured between the side firebox wall and a longitudinal axis of the tube. Because the vessel 70 ideally extends substantially parallel to the side firebox wall 86, the tube 100 is oriented at the same angle with respect to the vessel as the side firebox wall. It is understood however that the vessel 70 may be disposed in the fire chamber 28 at an angle to the side firebox wall 86 such that the orientation of the tube 100 and vessel is different from the orientation of the tube and the side firebox wall. The tube 100 may be oriented at other angles relative to the side firebox wall 86, including orthogonally to the vessel within the scope of the present invention.

The angled orientation of the burner 84 and burner tube 100 allows for the use of a straight tube to achieve the desired tube angle between the tube and side firebox wall 86. A curved or bent tube would tend to cause heat build-up within the inner wall of the tube as a result of the flame from the burner 84 directly impinging on the curve or bend in the tube. This build-up could cause the burner 84 to shut down or otherwise become damaged.

Moreover, the combination of the front-mounted fire chamber door 50C and the angled burner tube 100 produces an upward thrust in the heat path from the fire chamber 28 to the cooking chamber 30. The upward thrust is also due in part to angled plates 106, 108 welded to the bottom 22, back wall 14 and side wall 16. Because of the angle of the burner tube 100 and elliptical hole 102, the flames (represented by arrows in FIG. 4) having a plume shape tending to be more that of a cone of elliptical cross section, rather than circular cross section. The flame impinges on the fuel in the vessel 70 over a greater area of the vessel and along a greater length. Therefore, there is a more even distribution of flame contact with the fuel along the full length of the vessel 70 which produces a more even combustion of the fuel. This is in contrast to previous designs where the flames impinge on the vessel 70 perpendicularly. This perpendicular orientation tends to cause a concentration of flame impingement at a center of a solid fuel vessel resulting in an uneven combustion of the fuel. The burner tube arrangement of the present invention reduces the chance of concentrated flame impingement on any one particular area of the vessel.

An additional benefit of having front access to the fire chamber 28 and burner chamber 29 is that a grease drain (not shown), which in previous designs was funneled to the side of the oven, can now be channeled to the front 12 of the oven. A front grease drain will not only facilitate draining grease that is produced from the meat products as they are cooked, but it also allows for the removal of degreaser, water and other products used to clean the oven 10.

In one embodiment, a thermostat 104, broadly a controller, is mounted on the housing 11 and is connected with the burner 84 by electrical wiring and controls (not shown) in a conventional manner. The thermostat 104 is adjusted to maintain a desired temperature within the cooking chamber 30 by controlling the current flowing to the burner 84. Thermocouples 105 (see FIG. 2), broadly temperature sensors, are secured within the cooking chamber 30 and provide temperature input to the thermostat 104. For example and without limitation, the thermocouples may be part of a primary thermostat (e.g., thermostat 104), a secondary thermostat, a thermometer and an upper limit control switch thermostat. The thermostat 104 may be a conventional thermostat such as a Robertshaw 5300-17E and may use simple logic or may receive input from thermocouples and use staged or sequenced logic. When the desired temperature is achieved, (suitably between about 200 degrees F. and about 250 degrees F., the thermostat 104 automatically turns off the burner 84. When the temperature in the cooking chamber 30 falls sufficiently below the desired temperature, such as to a range between about 5 degrees F. and about 10 degrees F., the thermostat 104 reenergizes the burner 84, thus reestablishing combustion in the solid fuel in the vessel 70 and restoring the desired temperature. In this manner, the thermostat 104 controls the burner 84 to restore combustion of the fuel and maintain the air temperature within the oven 10 within a predetermined range.

In the illustrated embodiment, the thermocouples 105 for regulating the thermostat 104 are mounted on the side wall 16 at a top of the cooking chamber (FIG. 2). The thermocouples 105 are secured to a mount 144, which is secured to the side wall 16. The mount 144 includes openings for receiving the respective thermocouples. The thermocouples 105 may be secured within the cooking chamber at other locations within the scope of the present invention. Further, a protective screen 146 covers thermocouple tubes and connectors (not shown) that connect the thermocouples 105 to the thermostat. The screen 146 protects the thermocouple tubes and connectors while also allowing the ambient air of the cooking chamber 30 to flow around the tubes and connectors for more accurate measurements.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An oven for cooking foods comprising:
   a housing including a front wall, a back wall, a top wall, a bottom wall and opposing first and second side walls;
   a vessel for holding solid fuel for cooking, the vessel having a burner side extending along a length of the vessel defining a longitudinal burner side;
   a fire chamber in the housing adapted for holding the solid fuel vessel, the housing comprising a first movable closure at a location on the front of the housing mounted for opening and closing at a location to permit selective access to the solid fuel vessel in the fire chamber;
   a burner for producing a flame to ignite the solid fuel in the vessel;
   a cooking chamber in the housing adapted for holding food to be cooked by the oven, the housing comprising a second movable closure on the front of the housing mounted for opening and closing at a location to permit access to the cooking chamber, the cooking chamber having a bottom wall;
   a heat shield in the housing disposed above the fire chamber and below the cooking chamber bottom wall; and
   a tube having a longitudinal axis attached to an outlet of the burner and opening into the fire chamber and toward the longitudinal burner side of the vessel when disposed in the fire chamber so that the flame of the burner impinges directly upon the longitudinal burner side, the tube being oriented so that the longitudinal axis of the tube is oblique to the burner side of the vessel as received in the fire chamber; and
   wherein the tube orientation spreads the burner flame over an area of the longitudinal burner side of the vessel.

2. An oven as set forth in claim 1 further comprising a burner chamber in the housing, the burner being disposed in the burner chamber, wherein the housing further comprises a third closure on the front wall of the housing mounted for opening and closing at a location to permit selective access to the burner chamber.

3. An oven as set forth in claim 2 wherein the first closure comprises a first door pivotally mounted on the housing and the second closure comprises a second door pivotally mounted on the housing.

4. An oven as set forth in claim 3 wherein the third closure comprises a removable panel on the front wall of the housing.

5. An oven as set forth in claim 4 further comprising a first firebox wall extending rearward from the front wall of the housing separating the fire chamber from the burner chamber, and a second firebox wall extending from a back end of the first firebox wall toward the second side wall of the housing, the heat shield comprising a third firebox wall disposed above the first and second firebox walls.

6. An oven as set forth in claim 5 wherein the front wall, back wall, bottom wall, first and second side walls and first, second and third firebox walls form the fire chamber, and wherein the front wall, bottom wall, second side wall and first, second and third firebox walls form the burner chamber.

7. An oven as set forth in claim 1 further comprising a first angled plate disposed at a rear of the fire chamber and positioned to deflect flow of heated fluid within the fire chamber upward, the first angled plate comprising a planar airflow engagement surface extending from the bottom wall of the oven to the back wall of the oven, the first angled plate being angled upward toward the back wall of the oven.

8. An oven as set forth in claim 7 further comprising a second angled plate disposed at a side and rear of the fire chamber and positioned to deflect flow of heated fluid within the fire chamber upward, the second angled plate being angled upward toward the side wall of the oven.

9. An oven for cooking foods comprising:
   a housing including a front, a back, a top, a bottom and opposing first and second sides;
   a cooking chamber in the housing adapted to hold food to be cooked;
   an elongate vessel for holding solid fuel for cooking, the vessel having a burner side extending along a length of the vessel defining a longitudinal burner side;
   a fire chamber in the housing adapted for holding the solid fuel vessel;
   a burner chamber in the housing, the burner chamber holding a burner for producing a flame to ignite the solid fuel in the solid fuel vessel in the fire chamber;
   a firebox wall separating the fire chamber from the burner chamber, the vessel extending substantially parallel to the firebox wall when the vessel is held in the fire chamber;
   a tube having a longitudinal axis attached to an outlet of the burner and opening into the fire chamber and toward the longitudinal burner side of the solid fuel vessel when disposed in the fire chamber so that the flame of the burner impinges directly upon the longitudinal burner side, the tube being oriented so that the longitudinal axis of the tube is oblique to the burner side of the solid fuel vessel as received in the fire chamber; and wherein the tube orientation spreads the burner flame over an area of the longitudinal burner side of the vessel.

10. An oven as set forth in claim 9 wherein the firebox wall has an opening therein providing access from the burner chamber into the fire chamber, the longitudinal axis of the burner tube being oblique to the firebox wall.

11. An oven as set forth in claim 10 wherein the longitudinal axis of the tube forms an angle with the firebox wall of between about 100 and about 160 degrees.

12. An oven as set forth in claim 11 wherein the longitudinal axis of the tube forms an angle with the firebox wall of about 135 degrees.

13. An oven as set forth in claim 9 wherein the housing comprises a first closure on the front of the housing for providing selective access to the fire chamber at the front of the oven, and a second closure on the front of the housing for providing selective access to the cooking chamber.

14. An oven as set forth in claim 9 further comprising a cooking chamber bottom wall having a bottom surface, and wherein the firebox wall comprises a first firebox wall, the oven further comprising a second firebox wall extending from a back end of the first firebox wall toward the second side of the housing, and a heat shield extending from the front of the housing to the bottom surface of the cooking chamber bottom wall.

15. An oven as set forth in claim 9 wherein the solid fuel vessel and burner tube are arranged so that when the burner produces the flame, the flame impinges on substantially the entire burner side of the solid fuel vessel.

16. An oven for cooking foods comprising:
- a housing including a front wall, a back wall, a top wall, a bottom wall and opposing first and second side walls;
- a cooking chamber in the housing for holding food to be cooked, the cooking chamber having a bottom wall, the cooking chamber bottom wall having a bottom surface;
- a vessel for holding solid fuel for cooking, the vessel having a burner side extending along a length of the vessel defining a longitudinal burner side;
- a fire chamber in the housing including a floor adapted for holding the solid fuel vessel at a location within the fire chamber, the fire chamber being in fluid communication with the cooking chamber for passing heated air and smoke into the cooking chamber;
- a burner for producing a flame to ignite the solid fuel in the vessel;
- at least a portion of the cooking chamber being located directly above the solid fuel vessel location in the housing; and
- a heat shield in the housing disposed above the solid fuel vessel location in the fire chamber and below the cooking chamber bottom wall, the heat shield separating the fire chamber from the cooking chamber for impairing radiative heat transfer from the fire chamber to the cooking chamber; and
- a tube having a longitudinal axis attached to an outlet of the burner and opening into the fire chamber and toward the longitudinal burner side of the vessel when disposed in the fire chamber so that the flame of the burner impinges directly upon the longitudinal burner side, the tube being oriented so that the longitudinal axis of the tube is oblique to the burner side of the vessel as received in the fire chamber; and
- wherein the tube orientation spreads the burner flame over an area of the longitudinal burner side of the vessel.

17. An oven as set forth in claim 16 wherein the heat shield has a doubled walled construction including an inner member, an outer member and insulation material between the inner and outer members.

18. An oven as set forth in claim 17 wherein the heat shield is generally parallel to the floor of the fire chamber at the solid fuel vessel location, and extends upward toward a rear of the fire chamber.

19. An oven as set forth in claim 9 wherein the longitudinal axis of the tube makes an angle with the burner side of the vessel in a horizontal plane.

20. An oven as set forth in claim 1 wherein the heat shield extends to a bottom surface of the cooking chamber bottom wall.

* * * * *